United States Patent Office 3,459,667
Patented Aug. 5, 1969

3,459,667
PHOSPHOR AND METHOD OF PREPARATION THEREOF
Simon Larach and Perry N. Yocom, Princeton, N.J., assignors to RCA Corporation, a corporation of Delaware
No Drawing. Continuation-in-part of application Ser. No. 347,353, Feb. 26, 1964. This application Dec. 23, 1966, Ser. No. 604,116
Int. Cl. C09k 1/12, 1/16
U.S. Cl. 252—301.6    17 Claims

ABSTRACT OF THE DISCLOSURE

Luminescent materials consisting essentially of zinc and/or cadmium chalcogenides containing at least one rare earth activator and at least one alkali metal. The luminescent materials emit light almost entirely in one or a very few narrow spectral bands upon cathode ray excitation.

CROSS REFERENCES TO RELATED APPLICATIONS

This is a continuation-in-part of application Ser. No. 347,353, filed Feb. 26, 1964 now abandoned, by the same applicants and is assigned to the same assignee.

BACKGROUND OF THE INVENTION

Zinc chalcogenides containing rare earth activators, such as ZnS:Cu:Ce and ZnS:Dy, have been prepared as cathodoluminescent phosphors previously. The previous phosphors are generally characterized by exhibiting a cathodoluminescent emission over a relatively broad spectral band with one or more narow spectral bands superimposed thereon. By "narrow" is meant that the spectral band is less than about 100 A. wide.

An object of this invention is to provide an improved phosphor exhibiting a cathodoluminescent emission almost entirely within one or a few relatively narrow spectral bands.

Another object is to provide a novel method for preparing the phosphor of the invention.

SUMMARY

The phosphor of the invention consists essentially of a host material selected from the group consisting of single and mixed chalcogenides of zinc, cadmium, and zinc-cadmium, containing 0.001 to 1.0 mol percent of at least one rare earth element selected from the group consisting of praseodymium, neodymium, samarium, terbium, dysprosium, holmium, erbium, and thulium, and 0.0001 to 1.0 mol percent of at least one alkali metal. The molar proportion of the rare earth element is at least as great as the molar proportion of alkali metal. The phosphors of the invention exhibit a cathodoluminescent emission almost entirely within one of a few narrow spectral bands. This characteristic emission, which is substantially free of broad band emission is attributed to the incorporation in the host material of the limited proportion of alkali metal or metals as described above, together with the rare earth element and to the absence of incorporated halide and oxide. The phosphor of the invention is thereby adapted, for example, to uses which require a luminescent emission having relatively high spectral purity and to uses in which stimulated emission is required.

The novel phospher is produced by a method in which the constituents of the phosphor in elemental form and/or as compounds thereof are heated together so as to produce the phosphor and so that any combined oxygen or halogen present in the initial batch is substantially entirely absent from the product.

DESCRIPTION OF THE PREFERRED EBBODIMENTS

The range in composition of the phosphor of the invention may be represented approximately by the molar formula:

$$aM^1S:bM^2Se:cM^3Te:dM^4:eM^5$$

where $M^1$, $M^2$, and $M^3$ are each at least one member of the group consisting of zinc and cadmium; $M^4$ is at least one member of the group consisting of praseodymium, neodymium, samarium, terbium, dysprosium, holmium, erbium, and thulium; $M^5$ is at least one member of the group consisting of lithium, sodium, potassium, rubidium, and caesium; $a$ equals 0.0 to 1.0 mol; $b$ equals 0.0 to 1.0 mol; $c$ equals 0.0 to 1.0 mol; $d$ equals 0.00001 to 0.01 mol; $e$ equals 0.000001 to 0.01 mol; and $a+b+c$ equals 1.0.

In the phosphorus of the invention, the host material $(aM^1S:bM^2Se:cM^3Te)$ is a zinc, or cadmium, or zinc-cadmium chalcogenide. Chalcogenides, as used herein, are sulfides, selenides, tellurides, and mixtures thereof. The term does not include oxides or polonides. The preferred host materials are those which produce single phase solid solutions conveniently, although compositions which produce more than one phase may also be used. The preferred host material is zinc sulfide. The alternative host materials, may be considered to be the preferred zinc sulfide host material in which cadmium is substituted for part or all of the zinc; and/or selenium, and/or tellurium is substituted for part or all of the sulfur.

At least one rare earth element is present in the host material in proportions between 0.001 and 1.0 mol percent of the host material. Combinations of two or more rare earth elements may be used. The rare earth elements are selected from the group consisting of praseodymium, neodymium, samarium, terbium, dysprosium, holmium, erbium, and thulium. The preferred rare earth elements are determined by the application in which the phosphor is to be used. Because of the nature of the process of preparation described herein, the rare earth element is usually trivalent when it is incorporated in the host material. This is the preferred valency for the rare earth element. The rare earth element functions as the principal activator in the phosphor. The observed radiative emission appears to be associated with the characteristic 4f–4f transitions of the particular rare earth element incorporated in the host material.

At least one alkali metal is present in the host material in proporions between 0.0001 and 1.0 mol percent. The proportion of alkali metal is equal to or less than the proportion of rare earth element present in the host material. Phosphors in which the proportion of alkali metal greatly exceeds the proportion of rare earth element exhibit a lower brightness and, in some cases, a broad cathodoluminescent emission band in addition to the desired narrow cathodoluminescent emission band. A single alkali metal, or combinations of two or more alkali metals may be used. An alkali metal is an element of Group I–A of the Periodic Table of the Elements. The alkali metal is selected from the group consisting of lithium, sodium, potassium, rubidium, and caesium. The preferred alkali metal is determined by the application in which the phosphor is to be used and by the rare earth element which is present in the host material.

The exact function of the alkali metal in these phosphors is not completely understood. By one explanation, both the rare earth element and the alkali metal substitute for zinc and/or cadmium cations in the hot material. Since the rare earth elements are usually trivalent, the monovalent alkali cations may function as electronic charge compensators. However, other monovalent cations, for example copper or silver, do not produce the same advantageous effects as the alkali metal. For example, with copper or silver present, the cathodoluminescent emission may include both broad and narrow spectral bands.

In the novel phosphors, the function of the incorporated alkali metal appears to be completely different than in prior zinc or zinc-cadmium sulfides activated with copper, silver, or gold, and containing incorporated halide. In the novel phosphors the presence of alkali metal is essential to producing the improved phosphors, whereas the presence of alkali metal in the prior phosphors is not essential for this purpose. In the prior phosphors, the presence of halide is essential to producing good phosphors, whereas the presence of halide is neither essential or desirable in the novel phosphors because the presence of halide in the phosphor introduces broad brands in the luminescent emission. In preparing the novel phosphors, whatever halide has been introduced in to the batch is removed during the heating step or steps. It is noteworthy that fluorides (which are also halides) are undesirable in the prior phosphors, whereas fluorides may be used in synthesizing the novel phosphors without adverse effects.

The novel phosphors are generally prepared in two steps: (1) preparing a batch of the constituents, and then (2) heating the batch to produce the phosphor. The first step is designed to provide a uniform and intimate mixture of the constituents of the phosphor. The mixture of constituents is preferably but not necessarily free of oxygen and oxygen-containing compounds. The constituents of the host material may be introduced in various alternative ways. Sulfur, selenium, tellurium, zinc, and cadmium, may be introduced in elemental form or as oxygen-free compounds thereof. It is preferred that the constituents of the host material be prepared first by intimately mixing, as by ball-milling, chalcogenides of zinc and cadmium as required, and then calcining the mixture at between 800 and 1200° C. in an oxygen-free atmosphere, preferably hydrogen sulfide. The calcined host material mixture may be mixed and ground again and recalcined if necessary. The rare earth elements and the alkali metals are introduced as compounds thereof. The rare earth elements and the alkali metals may be introduced, for example, as fluorides, chlorides, bromides, iodides, carbonates, nitrates, sulfates, or acetates, and intimately mixed with the host crystals.

The second step is designed to react the host material mixture with the rare earth and alkali metal compounds to form the phosphor without incorporating oxygen or halogen therein and at the same time, eliminating any oxygen or halogen that is present in the batch. To this end, the mixture is heated in a non-oxidizing, hydrogen-containing, oxygen-free, halide-free ambient at temperatures between 700 and 1400° C. for between 0.1 and 10 hours. In the preferred process, the batch is heated in a hydrogen sulfide asmosphere for between 0.5 and 5 hours at between 1000 and 1200° C. The optimum heat treatment, that is, the combination of heating time and heating temperature for a particular batch, is determined empirically and is dependent in part on the compositions of the phosphor reaction product. The degree of heat treatment is generally lower as the content of cadmium, selenium, and tellurium is increased at the expense of zinc and sulfur. Higher heating temperatures or longer heating times or both are effective to eliminate any halogen that is present in the batch. The same is true in eliminating oxygen from the batch provided hydrogen or a chalcogenide-containing ambient is used. These principles may also be applied in refiring the phosphor. Some suitable ambients are the following gas atmospheres which are preferably at about normal atmospheric pressure: hydrogen, hydrogen selenide, hydrogen sulfide, ammonia, and mixtures thereof. When the heating is completed, the phosphor reaction product is cooled to room temperature and is ready for use as a phosphor. To improve homogeneity, the reaction product may be ground and refired one or more times.

The posphors described herein are photoluminscent. Most phosphors described herein luminesce both at room temperature and liquid nitrogen temperature (77° K.) when excited with 3660 angstrom light or, preferably, to light corresponding in energy to the band gap of the phosphor. The photoluminescent emission is principally in one or a few narrow spectral bands which appear to be associated with the characteristic $4f$—$4f$ transitions of the particular rare earth element incorporated in the host material.

The phosphors described herein are particularly adapted for cathode ray excitation. This phosphor exhibits good visual brightnes and does not show a visually detectable color shift upon changes of excitation level. The cathodoluminescent emission is substantially entirely in one or a few narrow spectral bands, with substantially no emission in broad bands, or in a large number of narrow bands distributed over broad regions of the spectrum. The phosphors described herein therefore exhibit a high spectral purity relative to previous phosphors. It is thereby adapted for use in kinescopes for black-and-white and color television, and for use in oscilloscopes and other cathode ray tubes where high brightness over a narrow spectral band is desired.

As described above, upon excitation, the phosphors described herein emit light in a relatively narrow band which is characteristic of the rare earth present in the host material. When one of these phosphors is present in a resonant structure, such as a Fabry-Perot resonator and is held at a suitable temperature, coherent radiation may be produced in the resonator by stimulated emission. In the preferred structures, the phosphor is prepared as a single crystal, suitably electroded on opposite faces to constitute a resonant structure. In other embodiments, particles of the phosphor may be disposed in a medium of suitable refractive index and of suitable shape to provide a resonant structure. In still other embodiments, the phosphor may be contained in a long filament to provide a sufficiently long path length for the emission to build up in intensity to produce coherent emission.

Example 1

Mix one mol part $Na_2CO_3 \cdot H_2O$ with two mol parts Tm, as $TmCl_3$ or $Tm(NO_3)_3$, by ball milling. Heat this mixture in $H_2S$ at about 1100° C. for about 1 hour and then cool the Na-Tm reaction product to room temperature. Ball mill the reaction product to through 325 mesh. Mix 250 milligrams of the milled Na-Tm reaction product with 100 grams of pure zinc sulfide, as by ball milling. Heat this mixture at about 1150° C. in a $H_2S$ atmosphere for about one hour and then cool the resultant phosphor reaction product to room temperature. The reaction product is a phosphor having the approximate calculated molar composition ZnS:0.001 Tm:0.001 Na. This phosphor exhibits a blue cathodoluminescent emission band centered at about 4755 angstroms with a bandwidth of about 70 angstroms. Fine structure in this band may be more or less noticeable. No color shift has been observed with changes in excitation level.

Example 2

Mix one mol part $Na_2CO_3 \cdot H_2O$ with one mol part Tm, as $TmCl_3$ or $Tm_2(SO_4)_3$ and one mol part Dy as $DyCl_3$ or $Dy_2(SO_4)_3$, by ball milling. Heat this Na-Tm-Dy mixture in $H_2S$ at about 1100° C. for about 1 hour and then cool the Na-Tm-Dy reaction product to room temperature. Ball mill the reaction product to through 325 mesh. Mix 250 milligrams of the Na-Tm-Dy milled reaction product with 100 grams of pure zinc sulfide, as by ball milling. Heat the mixture at about 1150° C. in a $H_2S$ atmosphere for about one hour and then cool the product to room temperature. The product is a phosphor having the approximate calculated molar composition ZnS: 0.001 Tm:0.001 Dy:0.001 Na. The phosphor exhibits cathodoluminescent emission bands centered at about 4760 and 5770 angstroms with a bandwidth of less than about 100 angstroms. Fine structure in these bands may be more or less noticeable. No color shift has been observed with changes in excitation level.

Example 3

To 100 grams ZnS add 1.0 ml. of 0.1 M TmCl$_3$ solution, 1.0 ml. of 0.1 M LiCl solution, and enough water to form a uniform slurry. This slurry is dried at 110° C. After drying, it is fired in an H$_2$S atmosphere at about 800° C. for about 0.5 hour and then cooled to room temperature. The temperature is then increased to 1200° C. for about 0.5 hour. The product is a cathodoluminescent phosphor having a blue emission band centered at about 4760 A. with about a 70 A. bandwidth. The calculated molar formula of the phosphor is ZnS:0.0001 Tm:0.0001 Li.

Example 4

Follow the procedure of Example 3 except substitute DyCl$_3$ for TmCl$_3$. The product is cathodoluminescent, emitting in a spectral band less than 100 A. wide which is centered at about 5770 A. and has the calculated molar composition ZnS:0.0001 Dy:0.0001 Li.

Example 5

To 100 grams ZnS add 0.1 ml. of a solution of 0.5 M Tm$_2$(SO$_4$)$_3$ and 0.1 ml. of 0.5 M K$_2$SO$_4$ solution, and enough water to form a uniform slurry. Slurry this mixture to an even consistency and then dry at about 150° C. This dry mixture is then fired at about 800° C. for about 0.5 hour and then for about an additional 0.5 hour at about 1200° C.; both firings being done in an H$_2$S atmosphere. The calculated molar composition of the product is ZnS:0.0001 Tm:0.0001 K. The product is cathodoluminescent emitting at about 4760 A. in a band about 70 A. wide.

Example 6

To 100 grams ZnS add 1 ml. of 1 M HoCl$_3$ or Ho(NO$_3$)$_3$ solution and 1 ml. of 1 M LiCl or LiNO$_3$ solution and enough acetone to form a uniform slurry. Allow the acetone to evaporate and then fire the dry mixture at about 1200° C. in dry hydrogen sulfide for four separate one hour firing periods, separated by cooling periods during which the mixture is cooled to room temperature in hydrogen sulfide. The material is thoroughly mixed at room temperature in air during each of these cool periods. The product is a cathodoluminescent phosphor having approximately the calculated molar composition ZnS:0.001 Ho:0.001 Li. This phosphor emits in two narrow bands centered at about 5500 and 5950 A. in bandwidths of less than 100 A.

Example 7

To a mixture of 50 grams ZnS and 72 grams CdS add 10.0 ml. of 0.1 M HoCl$_3$ solution, 10.0 ml. of 0.1 M LiCl solution, and enough water to form a uniform slurry. This slurry is dried at 110° C. After drying, it is fired in an H$_2$S atmosphere at about 800° C. for about 1 hour and then cooled to room temperature. The temperature is then increased to about 1150° C. for about 0.5 hour and cooled to room temperature. The product is a cathodoluminescent phosphor having a red emission band centered at about 6500 A. with about a 70 A. bandwidth. The calculated molar formula of the phosphor is Zn$_{0.5}$Cd$_{0.5}$S:0.001 Ho:0.001 Li.

Example 8

To a mixture of 80 grams ZnS and 28.8 grams ZnSe, add 1.0 ml. of 0.1 M DyCl$_3$ solution and 1.0 ml. of 0.1 M NaBr solution and enough water to form a uniform slurry. This slurry is dried at about 110° C. After drying, it is fired in an H$_2$S atmosphere at about 800° C. for about 0.5 hour and then cooled to room temperature. The temperature is then raised to about 1150° C. for about 0.5 hour and cooled to room temperature. The product is cathodoluminescent, having a yellow emission band centered at about 5770 A. with about a 90 A. bandwidth. The calculated molar formula of this phosphor is ZnS$_{0.8}$Se$_{0.2}$:0.0001 Dy:0.0001 Na.

What is claimed is:

1. A luminescent material consisting essentially of a sulfide or sulfoselenide of at least one member of the group consisting of zinc and cadmium containing between 0.001 and 1.0 mol percent of at least one rare earth element selected from the group consisting of a praseodymium, neodymium, samarium, terbium, dysprosium, holmium, erbium, and thulium, and between 0.0001 and 1.0 mol percent of at least one alkali metal, and mol percent of rare earth element present being at least as great as the mol percent of alkali metal.

2. A luminescent material according to claim 1 consisting essentially of a sulfide or sulfoselenide of at least one member of the group consisting of zinc and cadmium containing between 0.001 and 1.0 mol percent of a rare earth element selected from the group consisting of a praseodymium, neodymium, samarium, terbium, dysprosium, holmium, erbium, and thulium, and between 0.001 and 1.0 mol percent of an alkali metal, the mol percent of rare earth element present being at least as great as the mol percent of alkali metal, said material being essentially free of incorporated halogen and oxygen.

3. A luminescent material as defined in claim 1 having the molar formula $$aM^1S:bM^2Se:dM^4:eM^5$$

where $M^1$, and $M^2$ are each at least one member of the group consisting of zinc and cadmium, $M^4$ is at least one member of the group consisting of praseodymium, neodymium, samarium, terbium, dysprosium, holmium, erbium, and thulium, $M^5$ is at least one alkali metal $a$=0.8 to 1.0 mol
$b$=0.0 to 0.2 mol
$d$=0.00001 to 0.01 mol
$e$=0.000001 to 0.01 mol
$a+b$=1.0 and the mol percent of rare earth element present being at least as great as the mol percent of alkali metal.

4. A luminescent material according to claim 1 consisting essentially of a zinc sulfide or sulfoselenide containing between 0.001 and 1.0 mol percent of at least one member of the group consisting of praseodymium, neodymium, samarium, terbium, dysprosium, holmium, erbium, and thulium, and between 0.0001 and 1.0 mol percent of at least one alkali metal, the mol percent of rare earth element present being at least as great as the mol percent of alkali metal present, said material being essentially free of incorporated halide and oxygen.

5. A luminescent material according to claim 1 consisting essentially of zinc sulfide containing between 0.001 and 1.0 mol percent of a rare earth element selected from the group consisting of praseodymium, neodymium, samarium, terbium, dysprosium, holmium, erbium, and thulium, and between 0.0001 and 1.0 mol percent of an alkali metal, the mol percent of rare earth element present being at least as great as the mol percent of alkali metal present.

6. A luminescent material according to claim 1 consisting essentially of a sulfide or sulfoselenide of at least one member of the group consisting of zinc and cadmium containing between 0.001 and 1.0 mol percent thulium, and between 0.0001 and 1.0 mol percent alkali metal, the mol percent of thulium present being at least as great as the mol percent of alkali metal present.

7. A luminescent material according to claim 1 consisting essentially of a sulfide or sulfoselenide of at least one member of the group consisting of zinc and cadmium containing between 0.001 to 1.0 mol percent praseodymium, and between 0.0001 and 1.0 mol percent alkali metal, the mol percent of praseodymium present being at least as great as the mol percent of alkali metal present.

8. A luminescent material according to claim 1 consisting essentially of a sulfide or sulfoselenide of at least one member of the group consisting of zinc and cadmium containing between 0.001 and 1.0 mol percent neodymium, and between 0.0001 and 1.0 mol percent alkali metal, the mol percent of neodymium present being at least as great as the mol percent of alkali metal present.

9. A luminescent material according to claim 1 consisting essentially of a sulfide or sulfoselenide of at least one member of the group consisting of zinc and cadmium containing between 0.001 and 1.0 mol percent samarium, and between 0.0001 and 1.0 mol percent alkali metal, the mol percent of samarium present being at least as great as the mol percent of alkali metal present.

10. A luminescent material according to claim 1 consisting essentially of a sulfide or sulfoselenide of at least one member of the group consisting of zinc and cadmium containing between 0.001 and 1.0 mol percent terbium, and between 0.0001 to 1.0 mol percent alkali metal, the mol percent of terbium present being at least as great as the mol percent of alkali metal present.

11. A luminescent material according to claim 1 consisting essentially of a sulfide or sulfoselenide of at least one member of the group consisting of zinc and cadmium containing between 0.001 and 1.0 mol percent dysprosium and between 0.0001 and 1.0 mol percent alkali metal, the mol percent of dysprosium present being at least as great as the mol percent of alkali metal present.

12. A luminescent material according to claim 1 consisting essentially of a sulfide or sulfosolenide of at least one member of the group consisting of zinc and cadmium containing between 0.001 and 1.0 mol percent holmium, and between 0.0001 and 1.0 mol percent alkali metal, the mol percent of holmium present being at least as great as the mol percent of alkali metal present.

13. A luminescent material according to claim 1 consisting essentially of zinc sulfide containing 0.001 and 1.0 mol percent dysprosium and 0.0001 to 1.0 mol percent lithium, the mol percent of thulium being at least as great as the mol percent of lithium.

14. A luminescent material according to claim 1 consisting essentially of zinc sulfide containing 0.001 to 1.0 mol percent thulium and 0.0001 and 1.0 mol percent sodium, the mol percent of thulium being at least as great as the mol percent of sodium.

15. A luminescent material according to claim 1 consisting essentially of zinc sulfide containing 0.001 to 1.0 mol percent thulium and 0.0001 and 1.0 mol percent potassium, the mol percent of thulium being at least as great as the mol percent potassium.

16. A luminescent material according to claim 1 consisting essentially of zinc sulfide containing 0.001 to 1.0 mol percent dyspnosium and 0.0001 to 1.0 mol percent lithium, the mol percent of dysprosium being at least as great as the mol percent lithium.

17. A method for preparing a luminescent material comprising heating at temperatures between 700° and 1400° C. a batch containing (a) a host material selected from the group consisting of single and mixed sulfide or sulfoselenide of zinc, cadmium, and zinc-cadmium, (b) with between 0.001 and 1.0 mol percent of at least one rare earth element, as a compound thereof selected from the group consisting of: praseodymium, neodymium, samarium, terbium, dysprosium, holmium, erbium, and thulium, and (c) between 0.0001 and 1.0 mol percent alkali metal as a compound thereof, in a hydrogen-containing, oxygen-free, halogen-free ambient, and mol percent of rare earth element present being at least as great as the mol percent of alkali metal present, said heating being continued until any substantial amounts of halogen and oxygen present in the batch are eliminated.

References Cited

UNITED STATES PATENTS

| | | | |
|---|---|---|---|
| 3,243,723 | 3/1966 | Van Uitert | 252—301.4 |
| 3,257,327 | 6/1966 | Nassau | 252—301.5 |
| 3,269,956 | 7/1966 | Larach et al. | 252—301.6 |

OTHER REFERENCES

Trapenznikova et al., "Some Optical Properties of New Zinc Sulfide Phosphors Activated with Rare Earths," Doklady Akad. Nauk U.S.S.R. 106, 230–2 (1956) abstracted in Chemical Abstracts vol. 50 10,539h, abstract only is required, copy in Group 120.

Kroger, Sodium and Lithium Activators of Fluorescence in Zinc Sulfide, Journal of Optical Society of America vol. 39, No. 8, August 1949 pp. 670–672, copy in scientific library.

TOBIAS E. LEVOW, Primary Examiner

R. D. EDMONDS, Assistant Examiner

PO-1050
(5/69)

UNITED STATES PATENT OFFICE
CERTIFICATE OF CORRECTION

Patent No. 3,459,667　　　　　　　　Dated　August 5, 1969

Inventor(s) Simon Larach and Perry N. Yocom

It is certified that error appears in the above-identified patent and that said Letters Patent are hereby corrected as shown below:

Column 2, line 69　　change "hot" to --host--

Column 3, line 58　　change "asmosphere" to --atmosphere--

Column 4, line 6　　change "posphors" to --phosphors--

Column 4, line 18　　change "brightnes" to --brightness--

Column 6, line 18　　change "and" (second occurrence) to --the--

Column 7, line 35　　change "sulfosolenide" to --sulfoselenide-

SIGNED AND
SEALED
MAY 5 1970

(SEAL)
Attest:

Edward M. Fletcher, Jr.
Attesting Officer

WILLIAM E. SCHUYLER, JR.
Commissioner of Patents